United States Patent
Tsai et al.

(10) Patent No.: US 9,502,720 B2
(45) Date of Patent: Nov. 22, 2016

(54) SEAWATER POWER GENERATION SYSTEM

(71) Applicant: Taiwan Carbon Nanotube Technology Corporation, Miaoli County (TW)

(72) Inventors: Chun-Hsien Tsai, Miaoli County (TW);
Kuang-Che Lee, Miaoli County (TW);
Chun-Jung Tsai, Miaoli County (TW);
Ting-Chuan Lee, Miaoli County (TW);
Yuan-Shin Huang, Miaoli County (TW)

(73) Assignee: TAIWAN CARBON NANOTUBE TECHNOLOGY CORPORATION, Zhunan Township, Miaoli County (TW)

( * ) Notice: Subject to any disclaimer, the term of this patent is extended or adjusted under 35 U.S.C. 154(b) by 268 days.

(21) Appl. No.: 14/488,869

(22) Filed: Sep. 17, 2014

(65) Prior Publication Data

US 2015/0079476 A1    Mar. 19, 2015

(30) Foreign Application Priority Data

Sep. 18, 2013    (TW) .............................. 102133812 A

(51) Int. Cl.
| | |
|---|---|
| H01M 6/50 | (2006.01) |
| H01M 4/583 | (2010.01) |
| H01M 4/38 | (2006.01) |
| H01M 4/12 | (2006.01) |
| H01M 6/04 | (2006.01) |
| H01M 4/46 | (2006.01) |

(52) U.S. Cl.
CPC ................. *H01M 6/50* (2013.01); *H01M 4/12* (2013.01); *H01M 6/04* (2013.01); *H01M 4/466* (2013.01); *H01M 2220/10* (2013.01); *Y10S 74/09* (2013.01)

(58) Field of Classification Search
CPC .. H01M 8/04007; H01M 8/188; H01M 8/18; H01M 8/04; H01M 4/583; H01M 4/381; H01M 4/12; H01M 4/466; H01M 6/50; H01M 6/04
USPC .................................. 429/231.6, 231.8, 122
See application file for complete search history.

(56) References Cited

FOREIGN PATENT DOCUMENTS

| | | |
|---|---|---|
| TW | M343721 | 11/2008 |
| TW | M437386 U1 | 9/2012 |

*Primary Examiner* — Karie O'Neill Apicella
(74) *Attorney, Agent, or Firm* — Muncy, Geissler, Olds & Lowe, P.C.

(57) ABSTRACT

A seawater power generation system is installed beside an ocean and comprises a seawater processing apparatus, a precipitation apparatus, a separation apparatus and a power generation apparatus. The seawater processing apparatus obtains seawater from the ocean and concentrates the seawater into concentrated seawater. The precipitation apparatus heats the concentrated seawater to form a precipitate of a metal oxide. The separation apparatus heats the metal oxide and reduces the metal oxide into a metal. The power generation apparatus uses the metal as a first electrode and includes a second electrode and an electrolyte contacting the first electrode and the second electrode. Thereby, the seawater is continuously fabricated into the first electrode. The electrolyte respectively reacts with the first electrode and the second electrode in an electrochemical reaction fashion to form a potential difference between the first and second electrode and generate stable electric power.

10 Claims, 2 Drawing Sheets

SEAWATER POWER GENERATION SYSTEM

FIELD OF THE INVENTION

The present invention relates to a power generation device, particularly to a seawater power generation system.

BACKGROUND OF THE INVENTION

Nuclear power is used by many advanced countries. However, nuclear power has problems of nuclear waste and massive thermal pollution. Therefore, more and more attention is paid to green energies that generate low pollution, such as wind power and solar power.

Taiwan patent No. M437386 disclosed a wind power device, which comprises a blade nacelle, a tower base, a tower, and a hydraulic transmission module. The blade nacelle has a set of blades. The tower base has a generator module and is installed on the ground fixedly. The tower is arranged between the blade nacelle and the tower base and supports the blade nacelle high above the ground. The hydraulic transmission module is spanned from the blade nacelle to the tower base and connected with the blades and the generator module. The blades drive the hydraulic transmission module to operate, and the hydraulic transmission module further drives the generator module to generate electric power.

Taiwan patent No. M343721 disclosed a solar power module, which is illuminated by sun light to generate electric power, and which comprises a solar panel, a frame, a first lens and a reflective plate. The solar panel is connected with the frame. The first lens is connected with the frame and arranged above the solar panel. The reflective plate is connected with the frame fixedly and tilted with respect to the first lens. The reflective plate reflects sun light to the first lens, and the first lens refracts the sun light into parallel light beams. Then, the parallel light beams illuminate the solar panel, and the solar panel generates electric power.

Wind power is sourced from wind energy, which is likely to be affected by the factors of weather and geography and hard to stably drive a wind mill continuously. Thus, wind power has poor reliability in quantity and quality. Solar power is likely to be affected by the weather, the shift of day and night, and the transition of seasons. Similar to wind power, solar power is unstable in quantity and quality.

SUMMARY OF THE INVENTION

The primary objective of the present invention is to solve the problem that the conventional power generation technologies are likely to be affected by the factors of weather, climate and geography and hard to generate power as expected in quantity, quality and timing.

In order to achieve the abovementioned objective, the present invention proposes a seawater power generation system, which is installed beside an ocean and comprises a seawater processing apparatus, a precipitation apparatus, a separation apparatus, and a power generation apparatus. The seawater processing apparatus includes a seawater obtaining device obtaining seawater from the ocean and a concentration device connected with the seawater obtaining device and concentrating the seawater into concentrated seawater. The precipitation apparatus includes a chamber communicated with the concentration device to receive the concentrated seawater and a first heater arranged inside the chamber and heating the concentrated seawater to form a precipitate of a metal oxide. The separation apparatus is connected with the precipitation apparatus and includes a second heater heating the metal oxide to reduce the metal oxide into a metal. The power generation apparatus uses the metal as a first electrode and includes a second electrode and an electrolyte contacting the first electrode and the second electrode. The first electrode and the second electrode of the power generation apparatus respectively react in an electrochemical reaction fashion with the electrolyte to form a potential difference between the first electrode and the second electrode and generate current.

The resource used by the seawater power generation system of the present invention is seawater. In comparison with wind or sunshine, seawater is unlimited in reserve and stable in supply. Seawater can refill the seawater power generation system to generate the metal functioning as the first electrode continuously and stably. As long as the seawater power generation system is installed beside an ocean, it can operate to generate electricity persistently. Contrarily, the solar power generation system is unlikely to generate power at night; the wind power generation system is likely to be affected by weather and hard to generate power as scheduled. Further, the wind power generation is obviously limited by geographic factors. Therefore, the seawater power generation system of the present invention has advantages of abundant resource, stable and persistent power generation, and less geographic limitations.

DETAILED DESCRIPTION OF THE PREFERRED EMBODIMENTS

The technical contents of the present invention will be described in detail in cooperation with drawings below.

Figure 1:
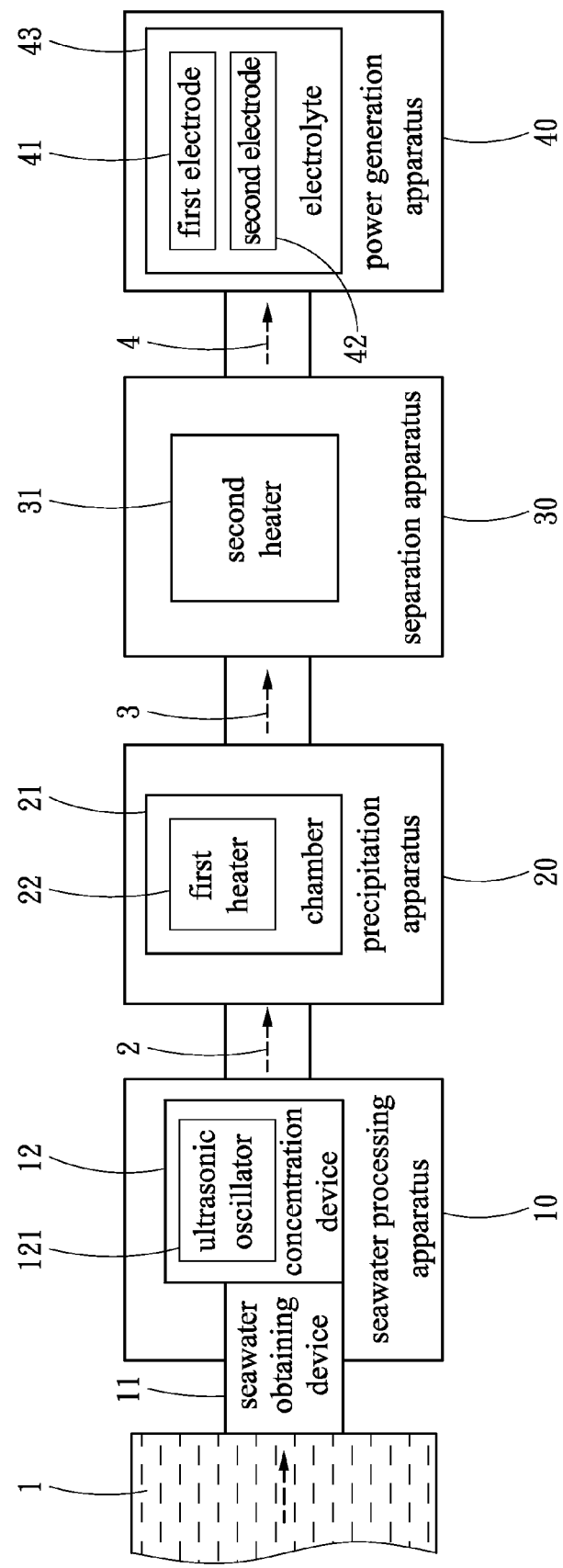
FIG. 1 is a diagram schematically showing a seawater power generation system according to a first embodiment of the present invention.

Refer to FIG. 1 a diagram schematically showing a seawater power generation system according to a first embodiment of the present invention. The seawater power generation system is installed beside an ocean, for example, installed at a coast or an island. The seawater power generation system of the present invention comprises a seawater processing apparatus 10, a precipitation apparatus 20, a separation apparatus 30, and a power generation apparatus 40. The seawater processing apparatus 10 includes a seawater obtaining device 11 and a concentration device 12. The seawater obtaining device 11 is connected with the ocean and obtains seawater 1 from the ocean. In the first embodiment, the seawater obtaining device 11 further includes an input end contacting the ocean, an output end opposite to the input end, and a pump. The pump pumps seawater 1 from the ocean through the input end to the seawater obtaining device 11. Then, the seawater 1 flows out of the seawater obtaining device 1 through the output end to the concentration device 12. In the first embodiment, the concentration device 12 further includes an ultrasonic oscillator 121. The ultrasonic oscillator 121 vibrates the seawater 1 to separate a precipitate from the seawater. In one embodiment, the precipitate is a hydrous compound including mainly magnesium chloride. Thereby, the seawater 1 is fabricated into concentrated seawater 2 having the precipitate. In one embodiment, the seawater 1 is concentrated via electrodialysis. In one embodiment, the seawater 1 is heated to remove water and generate the precipitate.

The precipitation apparatus 20 is connected with the seawater obtaining device 10 and includes a chamber 21 and a first heater 22. The chamber 21 communicates with the concentration device 12 to receive the concentrated seawater 2. The first heater 22 is arranged inside the chamber 21, heating the concentrated seawater 2 to form a precipitate of a metal oxide 3. In the first embodiment, the first heater 22 is a graphite heater powered by solar energy. However, the present invention does not limit that the first heater 22 must be a graphite heater powered by solar energy. The first heater 22 heats the concentrated seawater 2 to a temperature from 80° C. to 700° C. to generate the precipitate of the metal oxide 3. In one embodiment, the metal oxide 3 is a compound including mainly magnesium oxide and the magnesium oxide obtained from the hydrous compound including mainly magnesium chloride is according to the following reactions.

$$MgCl_2 \cdot 6H_2O \rightleftharpoons MgCl_2 \cdot 4H_2O + 2H_2O \quad (A)$$

$$MgCl_2 \cdot 4H_2O \rightarrow MgCl_2 \cdot 2H_2O + 2H_2O \quad (B)$$

$$MgCl_2 \cdot 2H_2O \rightarrow MgCl_2 \cdot H_2O + H_2O \quad (C)$$

$$MgCl_2 \cdot 2H_2O \rightarrow MgOHCl + HCl + H_2O \quad (D)$$

$$MgCl_2 \cdot H_2O \rightarrow MgCl_2 + H_2O \quad (E)$$

$$MgCl_2 \cdot H_2O \rightarrow MgOHCl + HCl \quad (F)$$

$$MgCl_2 + H_2O \rightleftharpoons MgOHCl + HCl \quad (G)$$

$$MgOHCl \rightleftharpoons MgO + HCl \quad (H)$$

The reaction (A) is carried out at a temperature from 96° C. to 117° C. The reaction (B) is carried out at a temperature from 135° C. to 180° C. The reactions (C) and (D) are carried out at a temperature from 185° C. to 230° C. The reactions (E) and (F) are carried out at a temperature above 230° C. The reaction (G) is carried out at a temperature above from 304° C. to 554° C. The reaction (H) is carried out at a temperature above 527° C.

The separation apparatus 30 is communicated with the precipitation apparatus 20 to receive the metal oxide 3. The separation apparatus 30 includes a second heater 31 heating the precipitation of the metal oxide 3 and reducing the metal oxide 3 into a metal 4. In one embodiment, the second heater 31 is a grid solar concentrator heater. However, the present invention does not limit that the second heater 31 must be a grid solar concentrator heater. The grid solar concentrator heater uses focused beam to excite the metal oxide 3 and heats the metal oxide 3 to a reducing temperature to induce a reduction reaction with a reducing agent. The reducing agent might be carbon, Si, Al, $CaC_2$, or Fe. Thereby, the metal oxide 3 is reduced into the metal 4. In the first embodiment, the metal oxide 3 is magnesium oxide; the second heater 31 heats magnesium oxide to a reducing temperature of over 1000° C. to reduce magnesium oxide into magnesium, i.e. the metal 4.

$$MgO_{(s)} + C_{(s)} \leftrightarrow Mg_{(g)} + CO_{(g)} \quad (I)$$

The enthalpy of the reaction (I) is 491.3 kJ/mol. The power generation apparatus 40 is connected with the separation apparatus 30 to receive the metal 4 output by the separation apparatus 30. The power generation apparatus 40 includes a first electrode 41, a second electrode 42 and an electrolyte 43. The first electrode 41 is directly fabricated from the metal 4. The second electrode 42 is a cathode made of a carbon material or carbon nanotubes. The carbon material is selected from a group consisting of graphite, carbon rods, carbon fiber, carbon ink, carbon nanoplates, carbon spheres, and activated carbon. The electrolyte 43 contacts the first electrode 41 and the second electrode 42. In one embodiment, the seawater 1 is directly used as the electrolyte 43. In one embodiment, the electrolyte 43 is a mixture solution including cations and anions. In the first embodiment, the electrolyte 43 respectively reacts with the first electrode 41 and the second electrode 42 electrochemically, and the electrochemical reaction is described by the following reactions:

$$Mg + 2H_2O \rightarrow Mg(OH)_2 + H_2 \quad (J)$$

$$O_2 + 2H_2O + 4e^- \rightarrow OH^- \quad (k)$$

The reaction (J) is occurred between the electrolyte 43 and the first electrode 41 and the reaction (k) is occurred between the electrolyte 43 and the second electrode 42.

Thus, the reaction between the metal of the first electrode 41 and the electrolyte 43 cooperates with the reduction reaction between the gas at the second electrode 42 and the electrolyte 43 to complete an electrochemical reaction fashion and form a power generation loop. Thereby, a potential difference exists between the first electrode 41 and the second electrode 42 to persistently generate electric power. Besides, the concentration device 12 of the seawater power generation system of the present invention also generates desalinated seawater, which can be further processed into domestic water, industrial water, or potable water.

Figure 2:
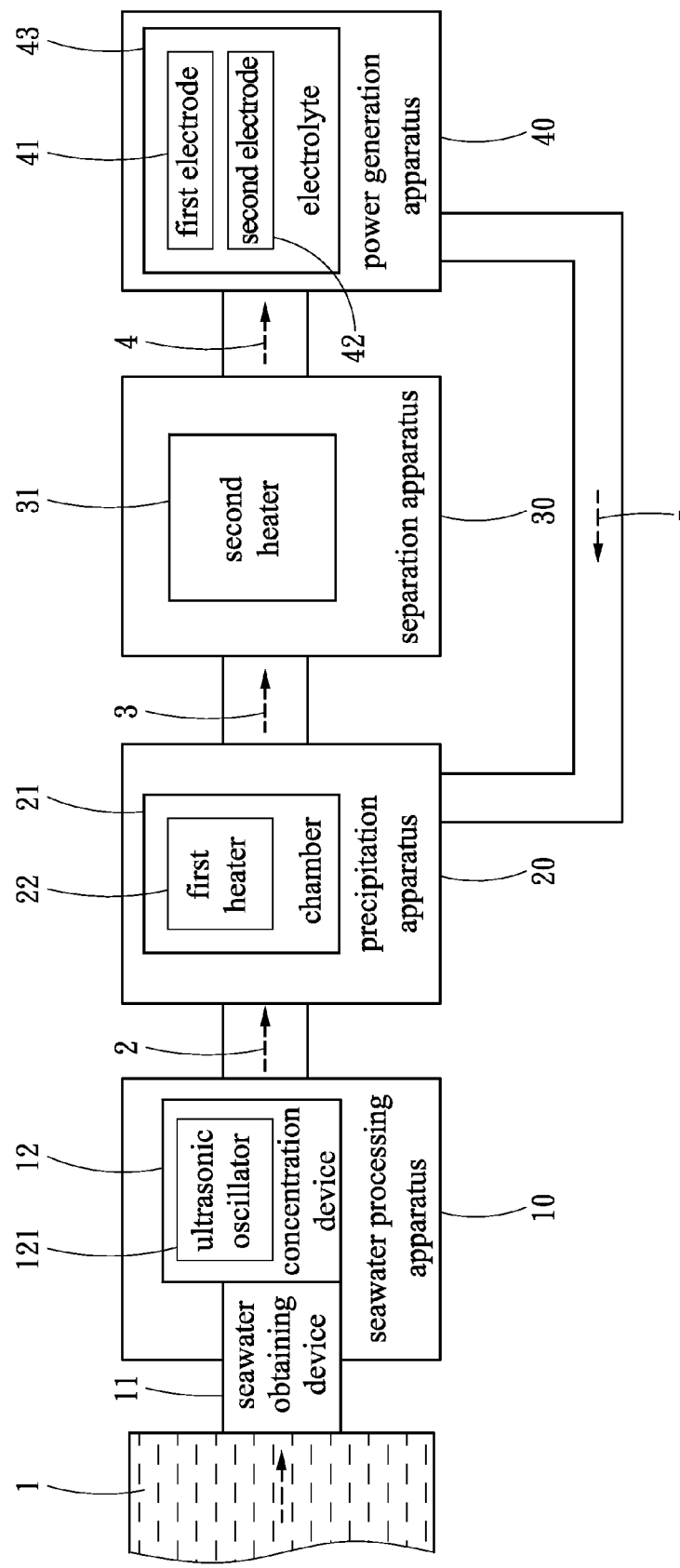
FIG. 2 is a diagram schematically showing a seawater power generation system according to a second embodiment of the present invention.

Refer to FIG. 2 a diagram schematically showing a seawater power generation system according to a second embodiment of the present invention. In the second embodiment, after the power generation apparatus 40 generates a metal hydroxide 5, such as magnesium hydroxide ($Mg(OH)_2$), in power generation, the metal hydroxide 5 is further transported to the precipitation apparatus 20. The first heater 22 of the precipitation apparatus 20 heats the magnesium hydroxide 5 to generate magnesium oxide, and the reaction is described by the following reaction:

$$Mg(OH)_2 \rightarrow MgO + H_2O \quad (L)$$

The abovementioned reaction takes place at a temperature of about 700° C. The product magnesium oxide is used as one of the components of the metal oxide 3.

In conclusion, the present invention is characterizing in extracting a metal from seawater to function as the first electrode and using the first electrode and the second electrode to undertake an electrochemical reaction and generate electric power. As seawater is much more abundant than other resources and can be supplied to the seawater power generation system continuously, the metal functioning as the first electrode can be produced persistently and stably. Therefore, the seawater power generation system of the present invention is superior to other technologies in resource reserve. As long as the seawater power generation system is installed beside an ocean, it can operate to generate electricity persistently. Contrarily, the solar power generation system is unlikely to generate power at night; the wind power generation system is likely to be affected by weather and hard to generate power as scheduled. Further, the wind power generation is obviously limited by geographic factors. Therefore, the seawater power generation system of the present invention has advantages of stable and persistent power generation and less geographic limitations. Besides, the seawater power generation system of the present invention also generates desalinated seawater, which can be further processed into domestic water, industrial water, or potable water.

What is claimed is:

1. A seawater power generation system installed beside an ocean and comprising
a seawater processing apparatus including a seawater obtaining device connected with the ocean and obtaining seawater from the ocean and a concentration device connected with the seawater obtaining device and concentrating the seawater into concentrated seawater;
a precipitation apparatus including a chamber communicating with the concentration device to receive the concentrated seawater and a first heater arranged inside the chamber and heating the concentrated seawater to form a precipitate of a metal oxide;
a separation apparatus connected with the precipitation apparatus and including a second heater heating the precipitate of the metal oxide to reduce the metal oxide into a metal; and
a power generation apparatus using the metal as a first electrode and including a second electrode and an electrolyte contacting the first electrode and the second electrode,
wherein the electrolyte respectively reacts with the first electrode and the second electrode in an electrochemical reaction fashion to form a potential difference between the first electrode and the second electrode and generate electric power.

2. The seawater power generation system according to claim 1, wherein the concentration device further includes an ultrasonic oscillator to separate a precipitate from the seawater to form the concentrated seawater.

3. The seawater power generation system according to claim 2, wherein the precipitate is magnesium chloride.

4. The seawater power generation system according to claim 1, wherein the first heater includes a graphite heater powered by solar energy.

5. The seawater power generation system according to claim 1, wherein the second heater includes a grid solar concentrator heater.

6. The seawater power generation system according to claim 1, wherein the metal oxide is magnesium oxide.

7. The seawater power generation system according to claim 1, wherein the metal is magnesium.

8. The seawater power generation system according to claim 1, wherein the second electrode is made of a material selected from a group consisting of carbon materials and carbon nanotubes.

9. The seawater power generation system according to claim 1, wherein the electrolyte is selected from a group consisting of the seawater and mixture solutions including cations and anions.

10. The seawater power generation system according to claim 1, wherein the power generation apparatus generates a metal hydroxide in the electrochemical reaction, and wherein the metal hydroxide is transported to the precipitation apparatus to mix with the concentrated seawater.

* * * * *

UNITED STATES PATENT AND TRADEMARK OFFICE
CERTIFICATE OF CORRECTION

PATENT NO. : 9,502,720 B2
APPLICATION NO. : 14/488869
DATED : November 22, 2016
INVENTOR(S) : Chun-Hsien Tsai et al.

It is certified that error appears in the above-identified patent and that said Letters Patent is hereby corrected as shown below:

On the Title Page

Item (73) Assignee, change "TAIWAN CARBON NANOTUBE TECHNOLOGY CORPORATION, Zhunan Township, Miaoli County (TW)" to -- TAIWAN CARBON NANO TECHNOLOGY CORPORATION, Zhunan Township, Miaoli County (TW) --

Signed and Sealed this
Twenty-second Day of August, 2017

Joseph Matal
*Performing the Functions and Duties of the*
*Under Secretary of Commerce for Intellectual Property and*
*Director of the United States Patent and Trademark Office*